Figure 1:
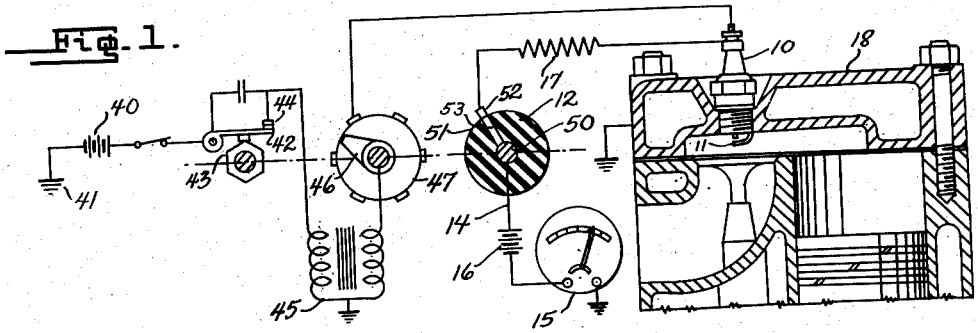

July 13, 1943. M. F. PETERS ET AL 2,324,458

SPARK PLUG TESTER

Filed March 18, 1942

Melville F. Peters
John P. Boston
Merlin Davis
INVENTORS.

BY
ATTORNEY

Patented July 13, 1943

UNITED STATES PATENT OFFICE 2,324,458

SPARK PLUG TESTER

Melville F. Peters, Beltsville, and John P. Boston, Garrett Park, Md., and Merlin Davis, Washington, D. C.

Application March 18, 1942, Serial No. 435,192

14 Claims. (Cl. 175—183)

(Granted under the act of March 3, 1883, as amended April 30, 1928; 370 O. G. 757)

This invention relates to a new and improved method and apparatus for measuring the resistance of a spark plug for an internal combustion engine, and more particularly to the improved method and apparatus for obtaining a substantially instantaneous measurement of the resistance of a spark plug when it is installed in an operating internal combustion engine, and at a particular point in the operation cycle of its respective cylinder.

The resistance of a spark plug must be equal to or greater than 175,000 ohms, otherwise the spark plug would misfire when used with the present ignition generating apparatus, therefore it is important to have available a method for quickly and easily obtaining an accurate measurement of the resistance of a spark plug. Furthermore, the value of the spark plug's resistance may be used as an index of the spark plug's condition. It is well known that after a spark plug has been in use for some time the insulation between the spark gap electrodes becomes coated or impregnated with carbonaceous and lead deposits and that these deposits which are conductive may in time form an electrically conductive path between the electrodes which will serve to carry a current sufficient to prevent the voltage impressed across the gap from building up to a value equal its break down potential. This conductive path formed on the dielectric of the plug causes the spark plug to misfire when it is installed in an engine. It should be apparent, therefore, that a measure of the spark plug's resistance would serve as a useful indication of the condition of the insulation in determining whether or not the plug is faulty and should be cleaned or replaced.

The resistance of a spark plug is not constant but changes with variations in temperature. Consequently the resistance measurements, to be useful as an index of the spark plug's condition, must be taken when the temperature of the plug is equal to its normal operating temperature. Because of the fact that the temperature gradients in a spark plug vary in different parts of the plug, it is substantially impossible to determine the temperature to which any part of the plug must be heated when it is not installed in an operating internal combustion engine in order to approximate the temperature it would acquire when installed in an operating cylinder of an internal combustion engine. It is desirable, therefore, to measure the resistance of the spark plug when it is installed in an operating cylinder of an internal combustion engine.

In obtaining the resistance measurements of spark plugs when they are installed in an operating internal combustion engine, it is essential that reoccurring resistance measurement be taken at substantially the same point in the operating cycle of the cylinder of the internal combustion engine into which the plug is installed because the resistance of the spark gap is subject to cyclic variations. For example, the resistance across the spark gap is quite low when the plug is firing because the spark discharge itself forms a good electrically conductive path. Furthermore, during combustion of the explosive mixture in the cylinder and during exhaust of the gases of combustion, the resistance across the gap is also relatively low because the gases of combustion offer a relatively good conductive path across the spark gap. Consequently, the resistance measurements must be taken at some particular point in the operating cycle of the particular cylinder into which the plug is installed other than during ignition, combustion or exhaust. It is preferred in this invention to make all comparative measurements during the compression stroke and at the same point in the compression stroke of the operating cycle of the test plug's respective cylinder.

It is a primary object of this invention, therefore, to provide a method for measuring the resistance of the spark plug which eliminates the present necessity of attempting to approximate the temperatures to which the plug must be heated when not installed in an engine in order to equal approximately the normal operating temperature which the plug would attain when installed in an operating internal combustion engine.

It is also an object of this invention to provide a novel method for obtaining the resistance measurements of the spark plug when the spark plug is installed in an operating cylinder of an internal combustion engine. This method permits the operator to discriminate between the low values of resistance across the spark gap which are present during periods of spark discharge, conbustion, expansion, and exhaust, and the higher resistance which exists during the remaining portions of the cycle. In this manner the resistance measurements may be taken at some point in that portion of the operating cycle during which the resistance of the spark gap is at its maximum value.

It is a still further object of this invention to provide a method for obtaining a rapidly reoccurring yet substantially instantaneous indication of the spark plug's resistance at the same selected instant in the operating cycle of test plug's respective cylinder.

A more specific object of this invention is to apply periodically a known and constant electromotive force to the spark gap of a spark plug which is installed in an operating internal combustion engine at a particular point in the operating cycle of the cylinder of said engine into which the said plug is installed and to observe the magnitude of current flowing in a conductive path formed between the electrodes defining said spark gap.

It is also a specific object of the invention to provide a timing device which is utilized in obtaining a rapidly recurring yet instantaneous measurement of the resistance of a spark plug installed in an operating internal combustion engine at a particular instant in the operating cycle of its cylinder and to control the timing device by utilizing the spark discharge of another operating spark plug in the same engine.

It is a further object of this invention to provide a device for obtaining a continuous indication of the cyclic variations in the resistance of an installed and operating spark plug whereby the maximum resistance of the plug may be noted.

Figure 2:
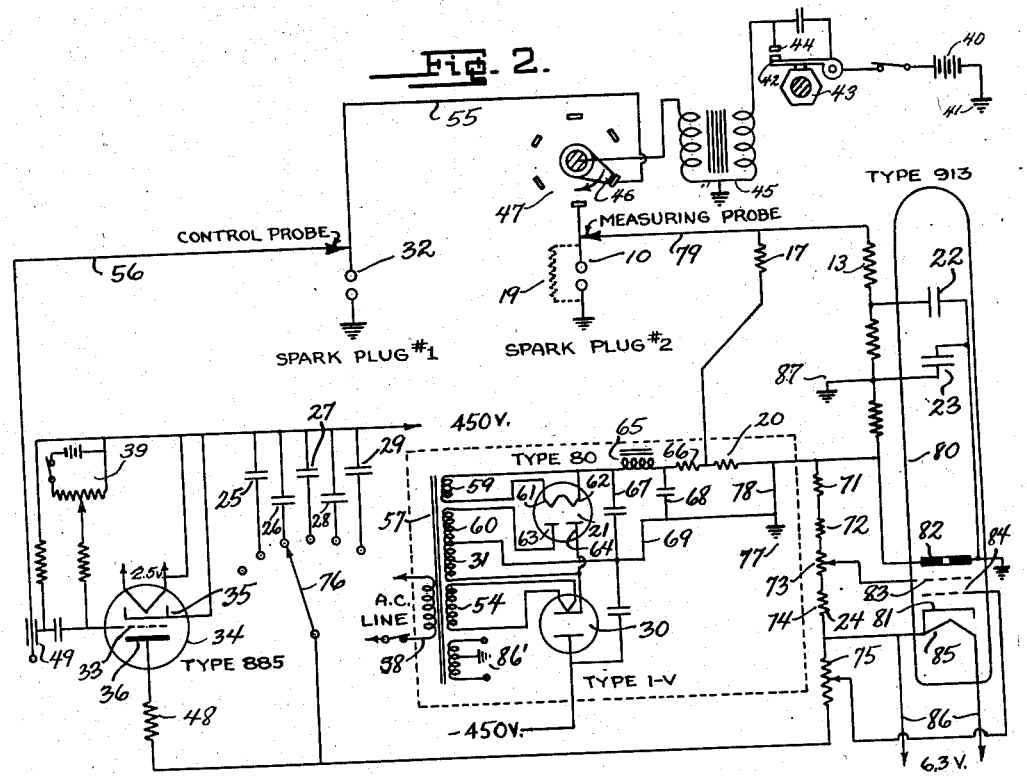
Figure 3:
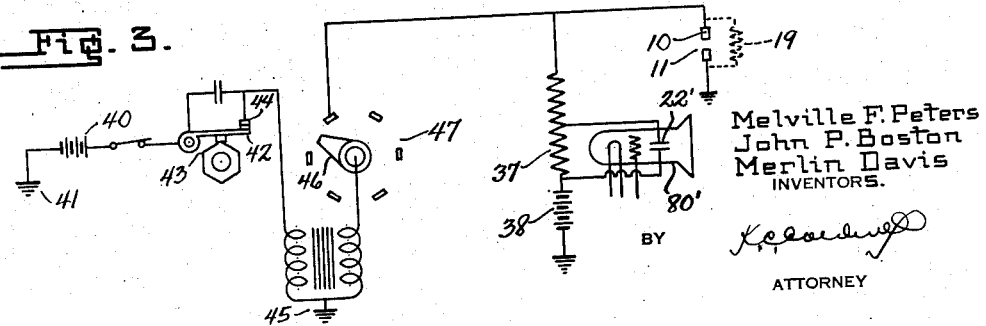

Other objects and advantages of this invention will become apparent from the specification as the specific features of certain preferred modifications are hereinafter described in detail in connection with the accompanying drawing, in which Fig. 1 is a schematic showing of one form of this invention employing a mechanically operated contact to obtain the spark plug's resistance measurements;

Fig. 2 is a schematic diagram of another and preferred form of an electrical circuit and apparatus for obtaining a comparative measurement of the resistance of a spark plug at a particular time in the operating cycle of the cylinder by utilizing the ignition voltage of another spark plug installed in the same engine; and Fig. 3 is a schematic circuit diagram of still another form of this invention.

In Fig. 1 of the drawing the particular cylinder of the internal combustion engine into which the test plug 10 has been installed is indicated generally by means of the reference numeral 18. A conventional ignition system for this internal combustion engine is disclosed and consists specifically of an electrical power supply source 40, one side of which is shown to be grounded at 41 and the other side of which is connected by means of a suitable current conductive lead to the movable contact 42 of the cam operated circuit interrupter 43. The contact 44 of this circuit interrupter is connected to one side of the grounded primary of the ignition coil 45, and the free terminal of the grounded secondary is connected to the rotor 46 of the distributor 47. This distributor is provided with a plurality of conventional stationary cooperating contacts each of which is connected to a different spark plug in accordance with the firing order of their respective cylinders.

The test circuit for measuring the resistance of the spark plug 10 of Fig. 1 is indicated generally at 14 on the drawing and consists specifically of a sensitive ammeter or galvanometer 15, a source of constant direct current potential 16 of a known magnitude, a fixed resistance 17 also of a known value, the spark plug 10 and a periodically actuated switch 12. The periodically actuated switch 12 consists of a rotary disc 51 of suitable insulating material having a conductive portion 53 formed therein and adapted to contact the stationary brush 52 as the disc is rotated about its axis by the shaft 50. This shaft 50 is driven by some synchronized part of the internal combustion engine such as the cam shaft and is timed so that the brush 53 contacts the conductive portion 53 of the disc 51 only at the particular instant in the operating cycle of the cylinder 18 at which the resistance measurements are to be taken.

It is thus apparent that the measurement of the resistance of the spark plug 10 may be taken during intake or compression when no conductive path is formed across the gap 11 such as exists during ignition, combustion and exhaust. In this manner one is able to obtain an actual measurement of the resistance of the dielectric which separates the spark gap electrodes. In the test circuit disclosed the resistance 17 is selected so as to be large enough to permit the plug 10 to fire when the ignition potential of the secondary coil is applied thereto through the distributor 47; unless of course the resistance of the test plug 10 is less than 175,000 ohms. It is preferable to have the ammeter 15 damped sufficiently so that it will not fluctuate greatly as a result of the rapidly recurring current impulses which flow in the test circuit. This ammeter may be calibrated to indicate directly the plug's internal resistance, since the reading in amperes may be readily converted into values of resistance by utilizing the known values of the voltage 16 and the resistance 17 in a simple application of Ohm's law.

Since the use of the rotary switch 12 requires mechanical timing, a modified system of a preferred embodiment of this invention, which does not require any synchronization of rotary switch contacts and which has several other advantages which will be apparent from a description thereof, is illustrated in Fig. 2. This modification utilizes the same ignition circuit as illustrated in Fig. 1 and corresponding reference numerals have been used to designate its similar and corresponding parts. A second spark plug 32 is illustrated diagrammatically and is shown connected by means of an ignition lead 55 to a stationary contact of the distributor 47. A control probe 56 connects this spark plug to the control grid 33 of the space discharge device 34, by means of the capacity coupling 49. An adjustable or variable negative bias is applied to the grid 33 from the source of grid potential 39. Connected directly across the terminals projecting from the enclosing envelope and leading from the anode 36 and the cathode 35 of this gas triode 34 and in series with the resistance 48 is any one of a plurality of individually selective condensers 25, 26, 27 and 28. A pivoted contact arm 76 is movable to the indicated positions so as to connect any one of these individual capacity units in shunt across the thyratron or space discharge device 34 to provide a discharge path for the particular condenser. The voltage at which a discharge between the anode and cathode occurs is controlled by the grid 33 and may be reduced to a value lower than or equal to the potential across the terminals of the selected condenser by the application thereto of a positive control potential. The discharge device is then said to be rendered conductive. In other words, the negative grid bias originally applied to the control grid 33 prevents current flow through the thyratron during charging of the condenser 26 connected across the plate circuit thereof. As soon as the ignition potential is applied to plug 32, however, the negative bias is removed and the capacitor 26 discharges rapidly through the gas triode 34 and loses its potential. As soon as the condenser voltage drops below the ionization potential of the gas in the tube 34, the grid 33 regains control and the current through the tube 34 ceases. The condenser may now be again recharged to start a new cycle of operation since the tube 34 is now non-conductive and acts as a closed control valve in the shunt circuit.

A suitable alternating current supply source is connected to the primary 58 of the transformer 57. One of the secondary windings 59 of the transformer 57 is connected to supply a heating current to the cathodes 61 and 62, producing a temperature rise therein sufficient for electron emission. The terminals of the secondary winding 31 of the transformer 57 are connected to each of the anodes 63 and 64 of the rectifier 21, and to complete the conventional "push pull" rectifying circuit the midpoint 60 of the secondary winding 31 is connected to the other output terminal comprising the cathodes 61 and 62 of the rectifier tube 21 through a series circuit which includes the inductive reactance 65 of the filter network, the fixed resistors 66 and 20 and the leads 78 and 69. The filter circuit includes in addition to the inductive reactance 65 the conventional shunting condensers 67 and 68. Thus a substantially constant direct current voltage is continuously applied to the series circuit including the fixed resistors 66 and 20.

Another secondary winding 54 of the transformer 57 is connected to supply current to a heating circuit for the cathode of the diode tube 30. The anode of this diode tube 30 is connected to the same terminal of the selective condensers 25 to 29 inclusive to which the cathode 35 of the space discharge device 34 is connected. This connection is not completed on the drawing but is indicated by the arrows and the potential of —450 v. The cathode of the diode tube, or half wave rectifier tube 30 is connected to one terminal of the secondary winding 31 of the transformer 57 and the conductor 69 leading from the midpoint 60 of this secondary winding 31 completes a series circuit shunting one of the selective condensers through the resistance units 71 to 75 inclusive of the voltage divider 24 by means of the selective contact arm 76. Thus a charging circuit for the selective condensers has been established from the secondary 31 through the diode 30 and the voltage divider 24.

A ground connection 77 is provided for the series resistance 20 through the conductive lead 78 and serves to connect the measuring probe 79 and the fixed resistance 17 in a series circuit through ground with the resistance 19 of the spark plug 10. Thus the voltage drop appearing across the resistance 20 which receives the source of energy from the full wave rectifier 21 is applied to a series circuit including the fixed resistance 17 and the resistance of the spark gap 19. A cathode ray oscillograph tube 80 is provided which has a cathode heating circuit 86 adapted to be connected to the terminals of the secondary winding 54.

The cathode 81, anode 82 and control grids 83, 84 of the cathode ray tube 80 are connected to their respective portions of the voltage divider 24, so that the cathode ray of this tube 80 will be initiated only when the current flowing in the series circuit including the voltage divider 24 has a magnitude sufficient to produce a voltage drop in the resistance elements 71 to 75 inclusive equal to that required to intiate the electron beam when the said voltage is applied to the cathode, anode and control grids of the said cathode ray tube. Thus the tube 80 is occulted the time during which no current flows in the series circuit containing the voltage divider 24 and is flashed only during the time current of a required magnitude flows therein.

For convenience of illustration, a conventional type of cathode ray device 80 has been illustrated having two sets of deflection plates 22 and 23. For the purpose of this invention, however, only a single set of these deflection plates are used; consequently the deflection plates 23 are shown grounded out by means of the ground connection 87. The remaining set of deflection plates 22 are connected across the resistance 19 of the spark plug 10 in series with the fixed resistor 13 so that the potential drop existing across the spark gap will always be applied to the deflection plates through the fixed resistor 13.

The apparatus disclosed in Fig. 2 operates as follows:

A control plug 32 is selected which will fire at the particular point in the operating cycle of the cylinder into which the test plug 10 is installed at which the resistance measurements are desired to be taken. The rectified potential of the secondary winding 31 of the transformer 57 is applied to a series circuit including the resistance element 20 and causes a substantially constant direct current to flow in this circuit so as to produce a substantially constant potential drop across this resistance element 20. This source of constant potential is impressed across the series resistance 17 and the internal resistance 19 of the spark plug 10. The cyclic change in the resistance 19 of the spark plug 10 causes the potential drop across any portion of the series circuit including the resistance 17 and the spark plug 10 to change in accordance with the variations in resistance of the plug. The cyclic variations in the potential drop which occur across the resistance 19 produce a cyclic variation in the potential applied to the deflecting plates 22, since the potential drop across the resistor 19 is applied to the series parallel circuit including the deflecting plates 22, their shunting resistor and the series resistance 13. The resistance 17 is connected in series with the spark gap so that the variations in resistance of the plug 10 produces variations in the potential division of the series circuit including the resistances 19 and 17. That is, were it not for the resistance 17 the potential drop occurring across the internal resistance 19 would not change with the cyclic variations of the resistance of the spark gap but would at all times equal the constant potential drop in resistor 20. It is thus apparent that the potential applied to the deflecting plates 22 is proportional to and therefore a measure of the resistance 19. While the potential drop across the spark gap resistance 19 varies cyclically with the variations in the resistance of the spark gap and while this potential drop is constantly impressed across the deflecting plates 22 of the cathode ray tube 80, this potential drop is used as a measure of the resistance only at the preselected instant or point in the cycle of the plug's respective cylinder, since the cathode ray tube is occulted at all times during the operating cycle of the cylinder 18 other than at the particular preselected instant or point. The tube 80 is flashed at this point in the operating cycle and the ray is detectable by noting the formation of a beam spot on the fluorescent screen of the cathode ray tube 80. The deflection of the beam spot will be a measure of the plug's resistance at the selected point.

The cathode ray tube is made to flash only at the selected instant by making its operation dependent upon the presence of a voltage drop in the resistance elements 71 to 75 inclusive which form the voltage divider 24. That is, so long as current flows in the circuit including the voltage divider 24 the cathode ray would be initiated and maintained. The source of voltage producing the current flow in this divider is the rectified potential of the transformer 31. And to make the current flow intermittent and controllable in accordance with the cyclic operation of the cylinder 18 into which the test plug is installed, there is connected in series with the voltage divider 24 one of the selective condensers 26 of the group 25 to 29 inclusive, and the half wave rectifier 30. The only current which can flow in this circuit which includes the voltage divider is the current necessary to charge one of the selected condensers. Each of the condensers have a different capacity ranging from one tenth of a microfarad to five thousandths of a microfarad; thus the time constant of the series circuit may be changed by the proper selection of one of the various condensers.

At the end of the period of time required to charge the selected condenser 26 the current flowing in the voltage divider 24 ceases, whereupon the potential applied across the cathode 81, anode 82, control grids 83 and 84 of the oscillograph 80 is likewise removed and the beam spot formed by the cathode ray or electron beam striking against the fluorescent screen occults or becomes extinguished due to the lack of a sufficient operating potential from the voltage divider.

Since current flow in the circuit must be made to occur only during the portion of the cycle at which resistance measurements are to be taken the discharge of the condenser and consequently the flow of a recharging current therefore is made to depend upon the ignition point in the operating cycle of another cylinder of the same internal combustion engine. That is, the ignition potential of the spark plug 32 is connected by the capacitive coupling 49 to the control grid 33 of the gas triode 34. This triode 34 when rendered conductive by removal of the negative grid bias forms a low resistance shunt path across the charged condenser 26 allowing the condenser to discharge. This discharge takes place during a comparatively short interval after the control plug 32 has fired and the grid control is restored to the tube 34 as soon as the potential of the selected condenser has dropped to a point where it is less than the ionization potential of the gas in the space discharge device 34 and will again gain control to act as a closed control valve in the circuit including the condenser 26.

The conductance of the path through the space discharge device 34 when the same is rendered conductive by the control grid 33 is so great compared to the conductance of the path through the half wave rectifier 30 that after the selected condenser 26 has sufficiently discharged there is no electron source sufficient to maintain ionization of the gas in the discharge device and the flow of current is interrupted. Substantially immediately upon discharge the selected condenser is again recharged through the diode 30 and the circuit including the voltage divider 24. During the recharging period the flow of current through the voltage divider 24 is again established and the cathode ray will be initiated forming a beam spot on the fluorescent screen of the oscillograph tube 80. This flash of the beam or ray takes place only during the recharging period of the selected condenser 26, and since at this particular instant the potential drop occurring across the resistance 19 of the plug 10 is applied through the resistance 13 to the deflection plates 22 of the cathode ray tube 80 the deflection of the beam spot will thus be proportional to the resistance of the spark plug at this particular instant. Hence the spot formed by the deflected beam is occulted or extinguished at all times except during the recharging period of the condenser, and since the occurrence of the recharging period is made to depend upon the ignition potential applied to the control plug 32, the flash of the cathode ray tube is also made at substantially the same point in the operating cycle of the cylinder 18.

Fig. 3 illustrates a further modification of this invention wherein substantially the same ignition circuit illustrated and described in modification of the invention shown in Fig. 1 is utilized. Corresponding reference numerals have been used to indicate the same parts of the ignition circuit in each of the various illustrated modifications. In the modification illustrated by Fig. 3, a source of constant electrical potential 38 is connected in series with a resistance 37 and the resistance 19 of the test spark plug 10. The deflection plates 22' of the constantly energized cathode ray tube 80' are connected across a portion of this resistance element 37. As the resistance of the spark gap changes in accordance with the operating cycle of the cylinder into which it is installed, the current flowing in the series circuit also changes inversely with the cyclic variations in resistance so that the voltage drop occurring across the portion of the resistance 37 to which the deflection plates 22' are connected will be a minimum when the resistance 19 is at its maximum value. The comparative value of the resistance of the plug may be obtained at the point in the cycle of the cylinder of the internal combustion engine into which the test plug 10 is installed at which it has its maximum resistance, simply by noting the minimum deflection of the cathode ray. This minimum deflection of the cathode ray produced with the test plug installed may be compared with the minimum deflection obtained when a plug of standard resistance is installed in the engine in order to enable the operator of the device to tell at a glance whether or not the resistance is above or below a fixed acceptable value, such as the value of 175,000 ohms mentioned above.

According to the provisions of the patent statutes the preferred forms of my invention have been illustrated and described, with the understanding, however, that certain modifications may be made without departing from the invention and that the invention may be practiced otherwise than specifically illustrated and described and still remain within the scope of the appended claims.

The invention described herein may be manufactured and used by or for the Government of the United States of America for governmental purposes without the payment of any royalties thereon or therefor.

Having now fully described our invention, what we claim is:

1. In a system for determining the substantially instantaneous resistance of a spark plug installed in an operating internal combustion engine at a particular point in the operating cycle of its respective cylinder other than during ignition, combustion or exhaust, the combination including a grid controlled space discharge device, means utilizing the periodically developed ignition potential of another installed and operating spark plug of the same internal combustion engine for rendering said space discharge device conductive, a condenser connected across the terminals of said space discharge device, a first source of unidirectional current, a resistance element, circuit forming means connecting said first unidirectional current source to said condenser in series with said resistance element to charge said condenser, a cathode ray oscillograph, means responsive to the potential drop across at least a portion of said resistance element for initiating said cathode ray, a second source of substantially constant direct current potential, circuit means connecting said second source of direct current potential to the spark gap of said test plug so that the cyclic change in the resistance of said gap will cause a corresponding cyclic change in the voltage drop across the spark gap of said test plug, and means utilizing the voltage drop across the spark gap of said test plug for deflecting the said cathode ray an amount proportional to the said voltage drop, whereby a rapidly recurring yet constantly deflected ray will indicate the substantially instantaneous resistance of the spark plug at the said particular point in the operating cycle of its cylinder.

2. In a system for determining the internal resistance of a spark plug installed in an operating internal combustion engine at a particular point in the operating cycle of its respective cylinder, the combination including a source of substantially constant electrical potential, circuit forming means for connecting said source of potential to the spark gap of said test plug so that cyclic variations in the resistance of said gap produce corresponding cyclic variations in the potential drop across the plug, a cathode ray tube, means substantially immediately responsive to the periodically developed ignition potential of another spark plug in the same engine for periodically initiating the cathode ray of said tube, and means for deflecting said ray an amount proportional to the potential drop across the spark gap of said test plug whereby the deflection of said rapidly recurring cathode ray will be an indication of the instantaneous value of the resistance of said plug.

3. In a system for determining the internal resistance of a spark plug installed in an operating internal combustion engine, the combination including a cathode ray tube having means for deflecting said cathode ray, means for controlling the said cathode ray tube so as to cause the said cathode ray to be occulted during a substantial period in the operating cycle of the cylinder of the internal combustion engine containing the spark plug under test and to flash at a particular point in the operating cycle of said cylinder other than ignition, combustion, and exhaust, and means for causing the said deflecting means to deflect said cathode ray an amount proportional to the electrical resistance across the spark plug under test whereby the said deflected cathode ray can be made to appear during a selected instant in the cycle of the said cylinder thus giving a rapidly recurring yet instantaneous measurement of the spark plug resistance at the selected instant.

4. In an electrical system for determining the internal resistance of a spark plug installed in an operating internal combustion engine at a particular point in the operating cycle of its respective cylinder, the combination including a source of substantially constant electrical potential, circuit forming means for connecting said potential to the spark gap of said test plug so that cyclic variations in the resistance of the spark gap of said test plug produce corresponding cyclic variations in the potential drop across said spark gap and means for obtaining a rapidly recurring yet instantaneous indication of the voltage drop across the spark gap of said test plug at the selected point in the operating cycle of the respective cylinder.

5. In a system for measuring the maximum internal resistance of a spark plug installed in an operating internal combustion engine, the combination including a fixed resistance element, an electrical power supply source of substantially constant potential, circuit forming means connecting said resistance element and spark gap of said spark plug to said power supply source, a cathode ray tube having ray deflecting plates and means connecting the deflecting plates across at least a portion of said fixed resistance element so that the cyclic variations in resistance of said plug will cause the potential drop across at least a portion of said resistance element to change producing variations in the deflection of said cathode ray, whereby the relative value of the maximum resistance of said spark plug may be determined by noting the deflection of said cathode ray.

6. In a system for measuring the maximum internal resistance of a spark plug installed in an operating internal combustion engine, the combination including a source of substantially constant electrical potential, a resistance element, circuit forming means for connecting said resistance element and potential source to the spark gap of said test plug so that cyclic variations in the resistance of the spark gap of said test plug produce corresponding cyclic variations in the potential drop across a portion of said resistance unit and means utilizing the variations in the potential drop across a portion of said resistance unit for indicating the cyclic variations in the resistance of said test plug, whereby the relative value of the maximum resistance of said spark plug may be determined.

7. In a system for measuring the internal resistance of a spark plug installed in an operating internal combustion engine the combination including an electrical power supply source of known potential, an ammeter, and means synchronized with said internal combustion engine for connecting said power supply source in a series circuit with said spark gap and ammeter at a particular point in the operating cycle of said engine other than during ignition, combustion or exhaust, whereby the cyclic changing resistance of the spark gap may be ascertained at the said particular point.

8. A method of ascertaining the internal resistance of a spark plug installed in an operating internal combustion engine at a particular point in the operating cycle of its respective cylinder which comprises the steps of applying a substantially constant electrical potential to a series circuit including the spark gap of said plug, applying at least part of the periodically developed ignition potential of another control spark plug installed in the same engine to the control grid of a space discharge device, discharging a charged condenser through the space discharge device when the said discharge device is rendered conductive by the periodically developed ignition potential applied to said grid, substantially immediately thereafter recharging said condenser through a series circuit containing a resistance element, applying the potential drop across at least a portion of said resistance element to the electrodes of a cathode ray tube to establish said cathode ray, and applying the potential drop across said gap to the deflecting plates of said cathode ray tube whereby a rapidly recurring yet instantaneous measurement of the spark plug's resistance at the particular point in the operating cycle of its respective cylinder may be obtained by noting the deflection of said ray.

9. A method of ascertaining the internal resistance of a spark plug installed in an operating internal combustion engine which comprises the steps of connecting a source of electrical current of substantially constant voltage to a circuit including the spark gap of said spark plug, periodically initiating the flow of an electron beam at a particular point in the operating cycle of said internal combustion engine other than during ignition, combustion, or exhaust, and substantially simultaneous with the initiation of said beam deflecting said beam an amount proportional to the voltage drop across said gap, whereby the location of the beam spot will be the criterion of the resistance of said plug at the particular point in the operating cycle of said internal combustion engine.

10. A method of determining the maximum resistance of a spark plug installed in an operating internal combustion engine which includes the steps of connecting a resistance to the said spark plug, connecting a substantially constant potential supply source in circuit with said resistance and the spark gap of said plug, and impressing the potential variations occurring in at least a portion of said resistance unit across the deflecting plates of a cathode ray tube whereby the deflection of said cathode ray will be a measure of the maximum resistance of said plug.

11. A method of ascertaining the resistance of a spark plug when installed in an operating internal combustion engine which comprises the step of impressing a known voltage across the spark gap of said plug at a particular point in the operating cycle other than during ignition, combustion or exhaust, and noting the current magnitude in the circuit including said spark gap, whereby the resistance may be ascertained at said particular point.

12. In a system for determining the resistance of a test spark plug installed in an operating internal combustion engine at a particular point in the operating cycle of its respective cylinder, the combination including a timing circuit, a space discharge device having a control grid in circuit with said timing circuit to establish the particular point at which said resistance measurements are to be taken, a control spark plug of the same engine into which said test plug is installed, an ignition system for said spark plugs, and means for applying at least a portion of the ignition potential of said control plug to the control grid of said space discharge device to cause said space discharge device to be rendered conductive in order to establish the point in the operating cycle of the cylinder into which the test plug is installed at which the resistance measurements are to be taken.

13. In a system for determining the resistance of a test spark plug installed in an operating internal combustion engine at a particular point in the operating cycle of its respective cylinder, the combination including a circuit having visual means for indicating said resistance, a space discharge device having a control grid for controlling the energization of the circuit including said resistance indicating means, a control plug installed in the same internal combustion engine as the test plug, and means for applying at least a portion of the periodically developed ignition potential of said control plug to the control grid of said space discharge device to render said device conductive.

14. In a system for determining the resistance of a test spark plug installed in an operating internal combustion engine, the combination including means for obtaining an electrical potential variable in accordance with changes in the resistance of said spark plug, means for producing a beam of electrons, means utilizing the periodical developed ignition potential of another cylinder of the same engine for intermittently initiating the flow of electrons in said electron beam producing means, and means utilizing said electrical potential to deflect said beam whereby to indicate the resistance of said spark plug at that point in the operating cycle of its respective cylinder at which the electric beam is initiated.

MELVILLE F. PETERS.
JOHN P. BOSTON.
MERLIN DAVIS.